J. Heller,
Water Wheel.
Nº 16,235.   Patented Dec. 16, 1856.
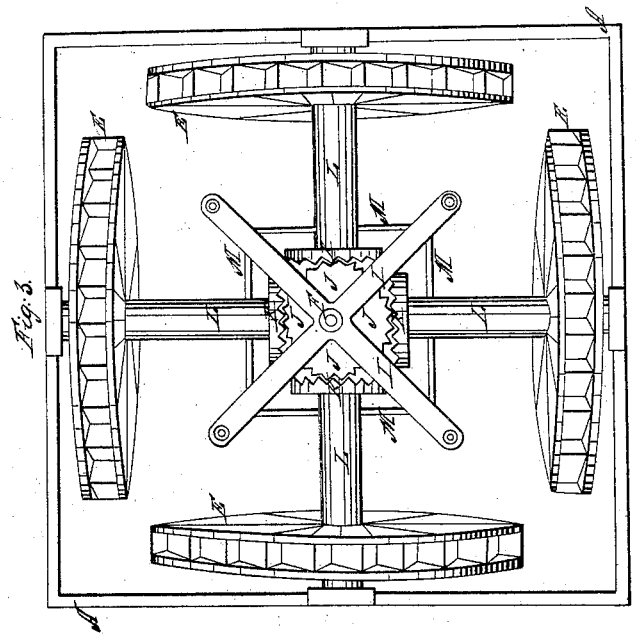
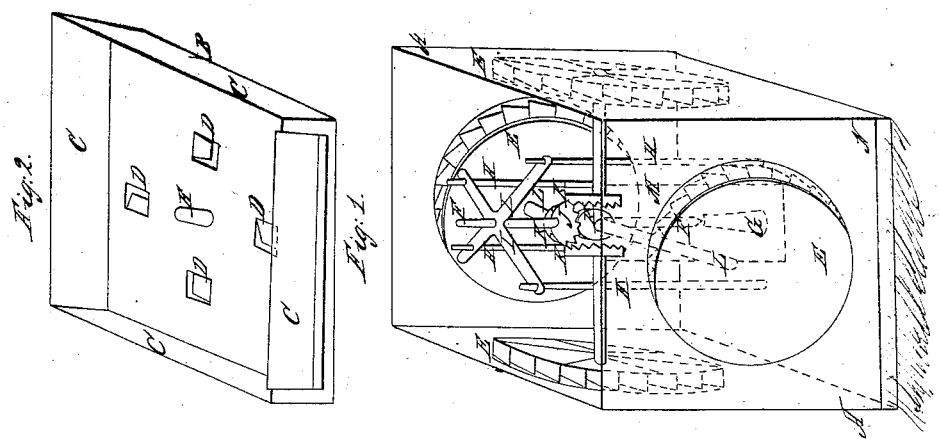

UNITED STATES PATENT OFFICE.

JOHN HELLER, OF EAST LAMPETER TOWNSHIP, LANCASTER COUNTY, PENNSYLVANIA.

PORTABLE WATER-MILL.

Specification of Letters Patent No. 16,235, dated December 16, 1856.

*To all whom it may concern:*

Be it known that I, JOHN HELLER, of the township of East Lampeter, in the county of Lancaster and State of Pennsylvania, have invented a new and useful Water-Power by Arranging and Combining Four Water-Wheels, which I call "The Portable Quadruple Water-Power;" and I do hereby declare that the following is a full, clear, and exact description of the construction and operation of the same, reference being had to the annexed drawings, making a part of this specification, in which—

Figure 1— is a perspective view of the water power box with its devices, Fig. 2— the lid and reservoir, Fig. 3, a sectional view, and the letters of reference marked thereon.

The nature of my invention is the arrangement and combination of four overshot water wheels (inclosed in a tub or box) working at right angles, operating on four separate axles, each axle having a driving wheel, so as to operate on the four sides of a bevel wheel and vertical shaft in the center, for the purpose of maintaining the shaft in its proper perpendicular position.

To enable others skilled in the art to make and use my invention, I will proceed to describe its construction and operation.

I construct a square tub or box A of any required size, with a corresponding lid or reservoir B to fit tightly on the top. The lid has four sides C for the purpose of holding the water, when it is let on through one of the sides C which operates as a gate to receive or shut the water off when necessary. This lid B has likewise four square apertures as shoots or flood gates D through which the water passes and shoots down upon four overshot wheels E located, and thus operated underneath, in the box A.

The four overshot wheels E are made any required size, according to the power required.

F is the main driving shaft located in the center and rests upon a step G below.

H are four posts or supports with arms I for the purpose of supporting the perpendicular position of the shaft F.

J is a bevel cog wheel, located on the shaft F, which is geared into and operated by four driving bevel cog wheels K. These driving cog wheels K are attached to the horizontal axles L of the overshot wheels E and revolve with them. The opposite ends of axles L operate in the sides of the box A and may be extended through the sides of the box A so that a balance or fly wheel can be attached to promote the regular motion of the overshot wheels E.

M is a center frame work which supports the axles L, N, the aperture or sluice at the bottom of the box A, through which the water is discharged.

The objects of my invention are to prevent the friction caused by the pressure against the one side of the shaft F, which causes the shaft to incline from its correct perpendicular line, which was heretofore invariably the result and effect from the operation of a single wheel. Also to create additional power by the combination of four wheels to form a water power from 3 feet square to any required size, so that the whole should answer as a portable power to be attached to any small stream of water, or pump in a farm yard, in any location, or to any mill seat or river. Also the advantage of operating overshot wheels of extended width according to any power required, while fourfold power is gained by the same quantity of water which would be barely sufficient to drive a single overshot wheel as heretofore in use—and thus a valuable fourfold power is created by the use of the least quantity of water, and the most important object, the saving of water, is attained. And also another important object is attained by my invention viz., a portable water power, at a much less expense than steam or horse power; to be applied to pumps to exhaust the water from wells or mines to facilitate mining operations.

What I claim as my invention and desire to secure by Letters Patent is—

The "portable quadruple water power" arranged and combined substantially as herein described.

JOHN HELLER.

Witnesses:
DEMONT F. MORENZY,
M. CARPENTER.